United States Patent
Li et al.

(10) Patent No.: US 9,246,830 B2
(45) Date of Patent: Jan. 26, 2016

(54) METHOD AND APPARATUS FOR MULTIMEDIA QUEUE MANAGEMENT

(75) Inventors: Zhu Li, Palatine, IL (US); Yong Wang, Sunnyvale, CA (US); Dong-Qing Zhang, Plainsboro, NJ (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 846 days.

(21) Appl. No.: 13/253,654

(22) Filed: Oct. 5, 2011

(65) Prior Publication Data

US 2013/0089107 A1 Apr. 11, 2013

(51) Int. Cl.
| | |
|---|---|
| H04L 12/28 | (2006.01) |
| H04L 12/823 | (2013.01) |
| H04L 12/835 | (2013.01) |
| H04L 29/06 | (2006.01) |
| H04N 21/647 | (2011.01) |

(52) U.S. Cl.
CPC .............. *H04L 47/323* (2013.01); *H04L 47/30* (2013.01); *H04L 65/80* (2013.01); *H04N 21/64738* (2013.01); *H04N 21/64769* (2013.01)

(58) Field of Classification Search
CPC ................................ H04L 12/56; H04L 65/80
USPC ........................................................ 370/412
See application file for complete search history.

(56) References Cited

U.S. PATENT DOCUMENTS

| | | | | |
|---|---|---|---|---|
| 6,047,000 A * | 4/2000 | Tsang et al. | ................. | 370/412 |
| 6,337,881 B1 * | 1/2002 | Chaddha | ................. | 375/240.16 |
| 6,405,258 B1 * | 6/2002 | Erimli | ................. | H04L 29/06 370/235 |
| 6,611,561 B1 * | 8/2003 | Hannuksela et al. | .... | 375/240.27 |
| 7,684,336 B2 * | 3/2010 | Cnudde et al. | ................. | 370/236 |
| 7,778,247 B2 * | 8/2010 | Green | ................. | 370/389 |
| 8,134,946 B2 * | 3/2012 | Sundaresan et al. | ................. | 370/315 |
| 8,259,794 B2 * | 9/2012 | Bronstein et al. | ................. | 375/240.03 |
| 8,750,232 B2 * | 6/2014 | Ray et al. | ................. | 370/329 |
| 2002/0071434 A1 * | 6/2002 | Furukawa | ................. | 370/392 |
| 2003/0233464 A1 * | 12/2003 | Walpole et al. | ................. | 709/231 |
| 2004/0136379 A1 * | 7/2004 | Liao | ................. | H04L 12/5695 370/395.21 |
| 2005/0152453 A1 * | 7/2005 | Lee | ................. | H04N 19/105 375/240.16 |

(Continued)

OTHER PUBLICATIONS

"Information technology—Coding of audio-visual objects—Part 2: Visual," International Standard, ISO/IEC 14496-2, 2001, 536 pages.

(Continued)

*Primary Examiner* — Guang Li
(74) *Attorney, Agent, or Firm* — Slater & Matsil, LLP

(57) ABSTRACT

Methods and systems for a multimedia queue management solution that maintaining graceful Quality of Experience (QoE) degradation are provided. The method selects a frame from all weighted queues based on a gradient function indicating a network performance rate change and a distortion rate caused by the frame and its related frames in the queue, and dropping the selected frame and all its related frames, and continues to drop similarly chosen frame until a network performance rate change caused by the dropping frame and its related frames meets a predetermined performance metric. A frame gradient is a distortion rate divided by a network performance rate change caused by the frame and its related frames, and a distortion rate is based on a sum of each individual frame distortion rate when the frame and its related frames are replaced by some other frames derived from remaining frames based on a replacement method.

20 Claims, 5 Drawing Sheets

(56) References Cited

U.S. PATENT DOCUMENTS

| | | | |
|---|---|---|---|
| 2007/0154065 A1* | 7/2007 | Kellerer et al. | 382/100 |
| 2008/0019371 A1* | 1/2008 | Anschutz et al. | 370/394 |
| 2008/0056184 A1* | 3/2008 | Green | 370/329 |
| 2008/0225859 A1* | 9/2008 | Mitchem | H04L 12/5693 370/395.21 |
| 2008/0259799 A1* | 10/2008 | van Beek | 370/235 |
| 2008/0285651 A1* | 11/2008 | Au et al. | 375/240.16 |
| 2009/0002379 A1* | 1/2009 | Baeza et al. | 345/522 |
| 2009/0022226 A1* | 1/2009 | Bang et al. | 375/240.16 |
| 2011/0002555 A1* | 1/2011 | Sodagar | 382/266 |
| 2011/0252155 A1* | 10/2011 | Parekh et al. | 709/231 |
| 2011/0261687 A1* | 10/2011 | Armstrong | H04L 12/4625 370/230 |
| 2011/0280125 A1* | 11/2011 | Jayakumar | 370/230 |

OTHER PUBLICATIONS

Chang, S.-F., et al., "Video Adaptation: Concepts, Technologies, and Open Issues," Proceedings of the IEEE, Jan. 2005, pp. 148-158, vol. 93, No. 1.

Ahmad, I., et al., "Video Transcoding: An Overview of Various Techniques and Research Issues," IEEE Transactions on Multimedia, Oct. 2005, pp. 793-804, vol. 7, No. 5.

Li, Z., et al., "Rate-Distortion Optimal Video Summary Generation," IEEE Transactions on Image Processing, Oct. 2005, pp. 1550-1560, vol. 14, No. 10.

Schwarz, H., et al., "Analysis of Hierarchical B Pictures and MCTF," ICME, 2006, pp. 1929-1932, IEEE.

* cited by examiner

DECODING DEPENDENCE

ORIGINAL FRAME SEQUENCE

FIG. 3(c) $$d_i = \frac{1}{m}\sum_{1}^{m} d(f_j, f'_j)$$

METHOD AND APPARATUS FOR MULTIMEDIA QUEUE MANAGEMENT

TECHNICAL FIELD

Embodiments of the present invention relate in general to multimedia queue management over a computer or communication network, and in particular to a multimedia queue management maintaining graceful Quality of Experience (QoE) degradation.

BACKGROUND

The Internet is a collection of various networks. As the Internet access lines are growing in speed and bandwidth, multimedia, e.g., video, communication services over the Internet are expected to become more popular. The services generally transfer multimedia including videos and speeches between terminals or between server terminals via the Internet. As an example, HTTP video streaming, such as Flash video, is widely deployed to deliver stored media over the Internet. Modern Media Transport (MMT) comprises the fragmented MP4 file format, the H.264 video codec, HTTP delivery, and a standard way to signal bitrate adaptation from the client. It is desired that streaming of multimedia content within heterogeneous environments have a Universal Multimedia Experience (UME). With developments in media compression and wireless network infrastructures, media streaming has become a promising area of technology for end-users, content providers, wireless and wired network operators, and other entities.

The Internet is a network whose communication quality is not necessarily guaranteed. For this reason, when performing communication using speech and video media, if network bandwidth is narrow or the network is congested between user terminals, the quality of the speech and video media perceived by users, known as the Quality of Experience (QoE), degrades. More specifically, quality degradation in a video is perceived as a blur, smear, mosaic-shaped distortion, and jerky effect in the video. The Quality of Service (QoS) for video communication services over the Internet such as HTTP video streaming may impact the user QoS which is the QoE.

The rapid growth of video traffic and the limitations in communication resources to provision such services present technical and business challenges to wireless operators and wired network operators alike. There is a need for a solution that can handle different throughput and communication resources variations, while preserving QoE for all users as much as possible.

SUMMARY OF THE INVENTION

These and other problems are generally solved or circumvented, and technical advantages are generally achieved, by embodiments of a system and method for a multimedia queue management maintaining graceful Quality of Experience (QoE) degradation.

In accordance with an example embodiment, a method for managing a first number of queues each with a queue weight is provided. A weight assigned to a queue may be a same value for all the first number of queues. The method first selects a set of candidate frames comprising a candidate frame for each queue among the first number of queues, wherein each frame in a queue has a frame gradient based on a gradient function indicating a network performance rate change and a distortion rate caused by the frame and its related frames in the queue, and a candidate frame of a queue has a minimal frame gradient among all frames in the queue. The method further selects a first dropping frame from the set of candidate frames, based on a candidate frame gradient of a queue and a queue weight of the queue; and dropping the first dropping frame and all its related frames. When a network performance rate change caused by the first dropping frame and its related frames does not meet a predetermined performance metric, the method further selects a second dropping frame from the set of candidate frames, based on a candidate frame gradient of a queue and a queue weight of the queue, and dropping the second dropping frame and all its related frames.

In accordance with an example embodiment, a method for managing a first number of queues each with a queue weight is provided. The method selects a dropping frame based on a frame gradient for all frames in each queue, wherein a frame gradient of a frame in a queue is a distortion rate of the frame in the queue divided by a network performance rate change caused by the frame and its related frames in the queue. Furthermore, a distortion rate of a frame in a queue is based on a sum of each individual frame distortion rate of the frame and its related frames in the queue when the frame and its related frames are replaced by some other frames derived from remaining frames in the queue based on a first replacement method. An individual frame distortion rate of a frame is an individual distortion rate between the frame and its replacement frame based on a Mean-squared error (MSE) method, a color histogram-based distance method, or a weighted sum of color change method. Furthermore, the distortion rate of a frame in a queue may be an average of each individual frame distortion rate of the frame and its related frames in the queue when the frame and its related frames are replaced by some other frames derived from remaining frames in the queue based on a replacement method. According to an example, the replacement method replaces a frame by its immediate precedent frame in the queue that is not a frame to be replaced.

In accordance with an example embodiment, a method for managing a first number of queues each with a queue weight is provided, wherein a queue has frames, a frame is a portion of a multimedia file, and a frame of a queue comprises a plurality of packets of a network. According with an example, a frame is an Intra coded picture, a Bidirectional picture, or a Predicted picture of a video file, and a related frame of a frame cannot be decoded by an end user without the frame.

In accordance with an example embodiment, a method for managing a first number of queues each with a queue weight is provided, wherein the gradient of a frame is computed by a sender of the frame, or by a controller within a network, the network performance rate change is based on a throughput of a network, a peak rate of a network, or a length of a queue, and the first dropping frame is selected from the set of candidate frames that has a minimal product of a candidate frame gradient of a queue and a weight of the queue. The method may be implemented by application specific hardware.

In accordance with an example embodiment, an apparatus for managing a first number of queues each with a queue weight is provide. The apparatus comprises a selection unit configured to select a set of candidate frames comprising a candidate frame for each queue among the first number of queues, wherein each frame in a queue has a frame gradient based on a gradient function indicating a network performance rate change and a distortion rate caused by the frame and its related frames in the queue, and a candidate frame of a queue has a minimal frame gradient among all frames in the queue. The selection unit is further configured to select a first dropping frame from the set of candidate frames, based on a candidate frame gradient of a queue and a queue weight of the queue. The apparatus further comprises a control unit configured to drop the first dropping frame and all its related frames. When a network performance rate change caused by the first dropping frame and its related frames does not meet a predetermined performance metric, the selection unit is further configured to select a second dropping frame from the set of candidate frames, and drop the second dropping frame and all its related frames.

In accordance with an example embodiment, an apparatus for managing a first number of queues each with a queue weight is provide, wherein a frame gradient of a frame in a queue is a distortion rate of the frame in the queue divided by a network performance rate change caused by the frame and its related frames in the queue, and a distortion rate of a frame in a queue is based on a sum of each individual frame distortion rate of the frame and its related frames in the queue when the frame and its related frames are replaced by some other frames derived from remaining frames in the queue based on a first replacement method.

BRIEF DESCRIPTION OF THE DRAWINGS

For a more complete understanding of the present invention, and the advantages thereof, reference is now made to the following descriptions taken in conjunction with the accompanying drawing, in which:

FIGS. 3(a)-3(c) illustrate an example multimedia frame replacement, reconstruction, and its distortion measurement.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
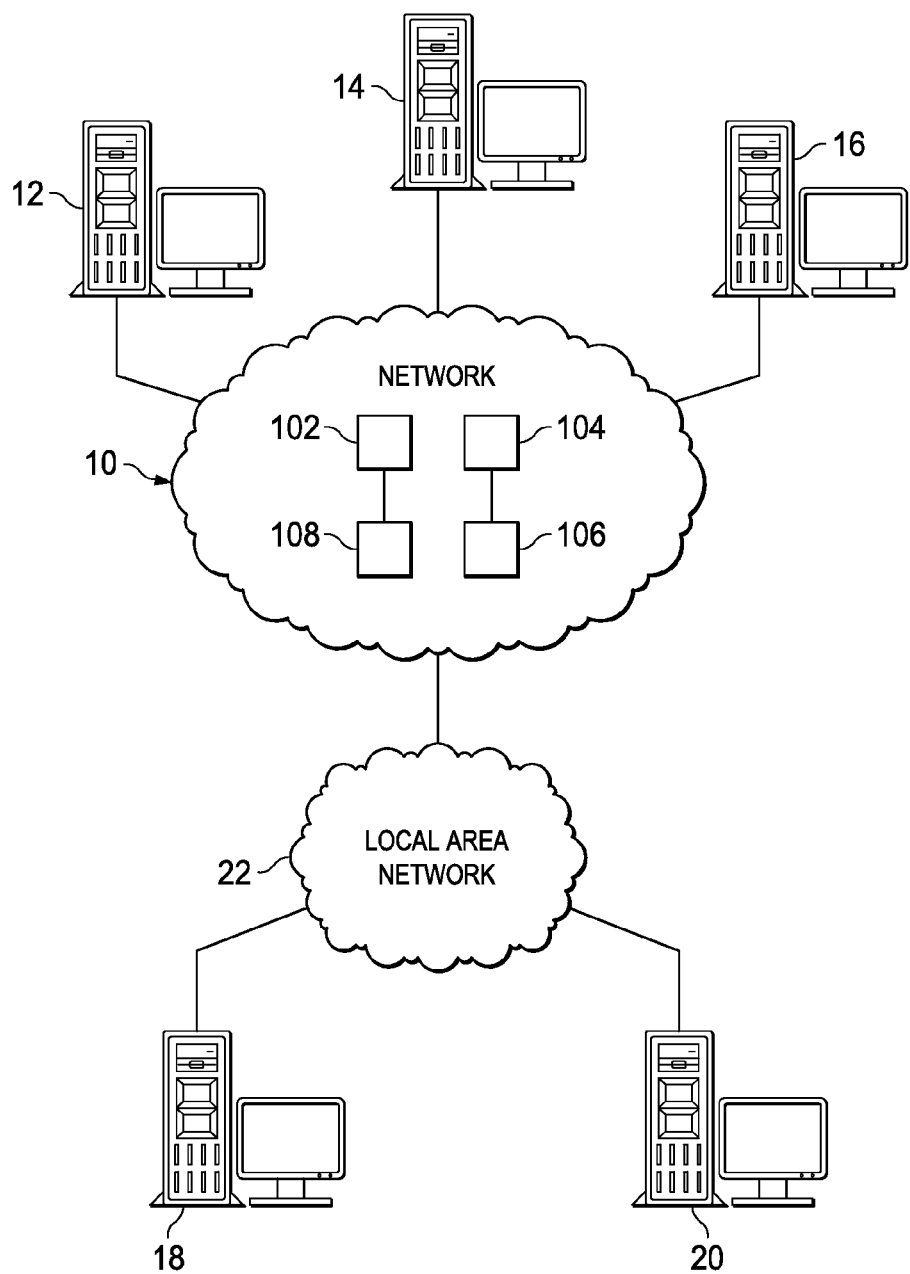
FIG. 1 illustrates an example computer and communication network.

FIG. 1 illustrates a network 10, which may be the Internet or a wide-area network (WAN), etc., allowing a group of computer systems 12, 14, and 16 to share multimedia content by transmitting and/or receiving data packets. The multimedia file may be a video file, an audio file such as a MP3 file, or a picture file such as a JPEG file. The multimedia file also may even be a text file. Multimedia file is used as a general term to refer any possible file format. The following discussion may use one type of multimedia file as a representative of all types of multimedia files, such as using a video file to represent any type of multimedia files.

As illustrated in the network shown in FIG. 1, computer systems 12-16 are connected to network 10 via hardwire connections. Other forms of connection such as wireless technology, including radio frequency (RF), infrared (IR), etc., may be implemented to provide connectivity. Furthermore, the wireless technology may be any of the current or future technologies such as General Packet Radio Service (GPRS), Worldwide Interoperability for Microwave Access (WiMAX), Universal Mobile Telecommunications System (UMTS), the 3rd Generation Partnership Project (3GPP), 1× Evolution-Data Optimized EV-DO, or Long Term Evolution (LTE).

Additionally, network 10 may be connected to one or more other networks for further propagation of the multimedia content. To illustrate this network scalability, additional computer systems 18 and 20 are connected by a local area network (LAN) 22 to network 10. As is known to one skilled in the art of network design and network applications, various types of equipment, such as routers and switches shown in FIG. 1 as nodes 102, 104, 106, and 108, etc., make up the networks 10 and 22, and methodologies (e.g., video-teleconferencing applications) may be implemented for sharing multimedia content. The nodes 102, 104, 106, and 108 may be edge routers, core routers, ATM switches, and so on, to perform any required functions to deliver the video content from one terminal to another through the network 10.

FIG. 1 illustrates desktop computer systems 12-20 connected to network 10 and LAN 22. In other embodiment computer systems 12-20 may include laptop computer systems, personal digital assistants (PDA), iPhones, IPADs, smart phones, music players, multimedia players, or other types of devices capable of transmitting and presenting video contents. The number of computers, the number of network nodes, and the number of networks shown in FIG. 1 are only for illustration purposes and are not limiting. There may be other number of computers and networks connected by different number of network nodes that serve the desired functions.

Figure 2A:
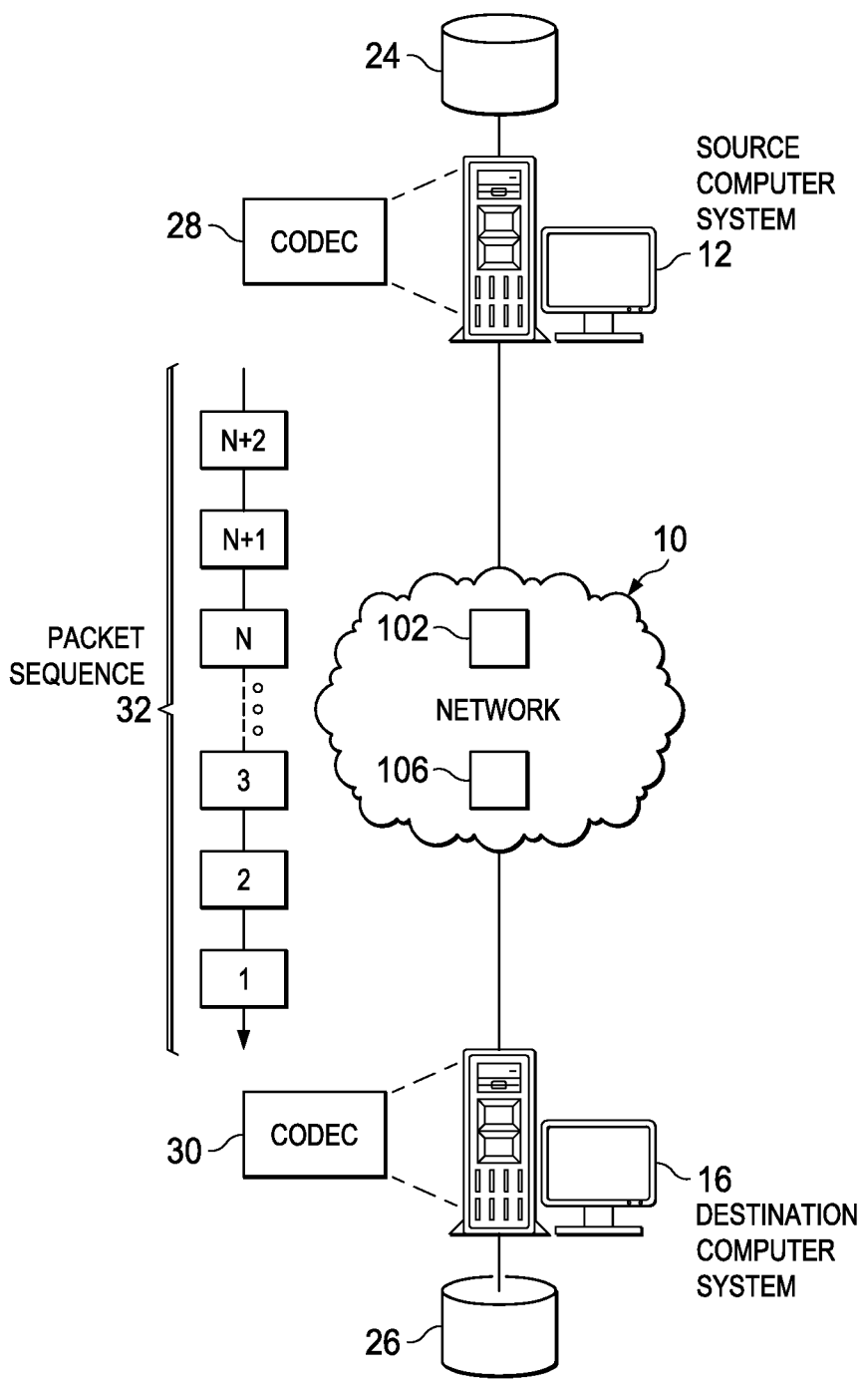
FIGS. 2(a)-2(c) illustrate detailed example operations and frame structure for multimedia communication between two terminals over the network.

FIG. 2(a) illustrates the transmission and delivery of multimedia files such as video content through the network by some of the computer systems 12 and 16 connected to network 10. In the embodiment, computer system 12 transmits video content through network 10 for reception at computer system 16. Various types of applications may call for such video transmissions, for example, a video-on-demand (VOD) system may be implemented to provide video content that is stored on a storage device 24 associated with computer system 12. Along with transmitting video content for uni-directional applications, video content may also be bi-directionally transmitted among two or more computer systems. For example, video content (along with audio content) may be transmitted in a bi-directional fashion for a video teleconference application.

To transmit the video content between the computer systems the content is segmented and stored in a sequence of discrete packets. Along with segmenting, the video content may be compressed to alleviate the need for relatively high data transfer rates and large storage capacity. Upon receipt, the compressed video content may be de-compressed for presentation or stored on a storage device 26 for retrieval and presentation at a later time. To provide this segmentation, compression, and decompression functionality, computer systems 12 and 16 include respective Coder/Decoders (codec) 28 and 30. These codecs may be implemented in hardware, software, or a combination hardware and software. For example, dedicated hardware codecs are available either as add-in computer cards or are integrated into video cards. Typically hardware-implemented codecs reduce the computing load on the central processing unit (CPU) of a computer system, thereby allowing the computer system to perform other tasks.

Codecs 28 and 30 may be configured to segment a video file into a sequence of frames, pictures, or packets. The terms frames, pictures, and packets are used in an interchangeable way to represent a unit of segmentation of a video file, or a unit of transmission in the network. A packet may represent a plurality of packets needed for transmitting a video frame or a picture. Codes 28 and 30 further compress and decompress each frame, picture, or packet into one or more formats that are known to one skilled in the art of data compression and decompression. For example, formats defined by the motion picture experts group (MPEG) (e.g., MPEG-1, MPEG-2, MPEG-4, etc.) including MPEG-4 part 10, also known as MPEG-4 Advanced Video Coding (AVC) or H.264, may be implemented. Other formats such as Windows Media Video (MWV-9) or Windows Media Video Professional (WMV-9 Pro) may be implemented as a compression scheme. There may be other encoding and compression standards existing or developed in the future that may be used with the embodiments, which may compress video content so that the content may be transmitted at a data rate supportable by the source and destination computer systems along with the network that connects the computer systems.

The segmented and compressed video content is transmitted as illustrated by a sequence of video packets 32, comprising packet numbers 1, 2 . . . N, N+1, and N+2, propagating from computer system 12 to network 10, passing through routers or switches such as node 102 and 106, before reaching the destination computer system 16. The packets are shown as transmitted for a uni-directional application (e.g., VOD) from the source computer system 10 to a destination computer system 16. In some other embodiments, the packets sequence may be transmitted for a bi-directional application.

Figure 2B:
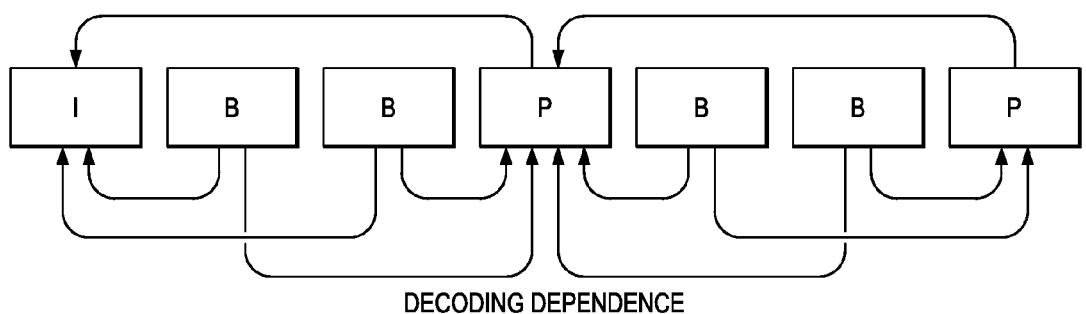

General compression techniques such as MPEG may achieve high compression rates by taking advantage of relationships among the sequence of packets 32, such as storing visual changes from one picture to another, instead of storing an entire picture in each packet. The information about visual changes from one picture to another is then encoded by an algorithm such as the discrete cosine transform (DCT) to reduce the data needed to represent an entire video picture. Additionally, techniques used to predict the contents of later video pictures, known as motion compensation, may be implemented to reduce the amount of data needed for transmission. There may be three types of video pictures inter-packet relationships among the sequence of packets 32, as shown in FIG. 2(b).

The first of the three picture types is an "Intra coded" picture (also known as an I-picture, I-frame, or I-packet). An I-picture is an independent picture in the sense that it does not reference video content of another picture in a sequence of video pictures. Since I-pictures are independent, a decoder typically starts decoding a video sequence with an I-picture and not with another type of picture. Thereby, to provide starting points, I-pictures are typically inserted every 12 to 15 pictures of a video sequence.

The second type of video picture is a "Predicted" picture (also known as a P-picture). A P-picture is encoded to include content that represents the differences between the video content of the P-picture and an I or another P-picture that are located earlier (e.g., directly before) in the packet sequence. A new P-picture is encoded by taking a previous I or P picture and predicting the values of each new pixel included in the new picture. Since P-pictures represent differences in the picture pixels, typically these pictures have larger compression ratios compared to I-pictures.

The third type of picture is a "Bidirectional" picture (also known as a B-picture). B-pictures use prediction in a manner similar to P-pictures, however, B-pictures may be related to an I or P-picture located in a previous position within the sequence and a P-picture located after the B-picture. Since B-pictures may need both previous and subsequent pictures for appropriate decoding, the order in which the pictures are accessed is not the same as the order for presentation. This provides improved compression compared to P-pictures.

The three types of pictures or frames are only illustrated as an example to show the inter-relationship between various video frames or pictures. There may be other types of picture classifications used in other types of compression schemes which may work with the disclosed embodiments in this disclosure.

Figure 2C:
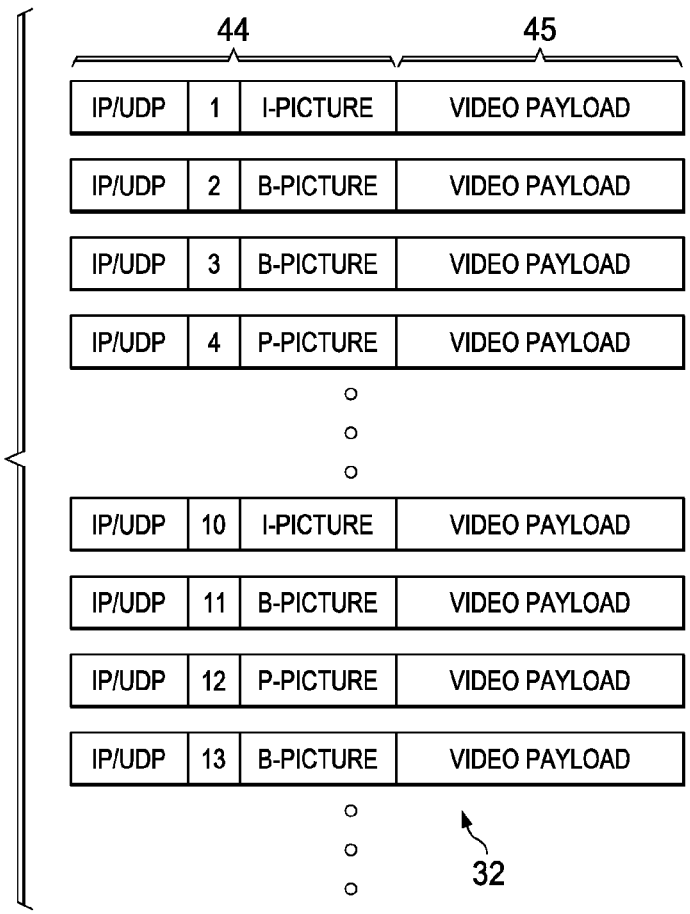

FIG. 2(c) illustrates some details of a sequence of video packets 32 by a series of individual blocks each representing a video packet. Each block represents one video packet that includes a header portion 44 and a video payload portion 45. A packet header portion 44 may include an assigned integer number to order the video packets into a sequence for displaying their contents to an end user. For illustrative purposes, the integers increment by one in this example, however, the video packets may also be received out of order and reassembled at the destination computer system. Additionally, in this illustration, each picture is completely encoded in a single video packet and each video packet contains a single picture. In some other embodiments, a picture may be further segmented and carried by a plurality of packets, in which case, the plurality of packets of a picture is treated together as one unit.

Header 44 may also comprise other data such as data for complying with the Real-Time Transport Protocol (RTP), not shown in FIG. 2(c). RTP is an Internet protocol standard that provides rules and methodologies for managing the real-time transmission of multimedia data for uni-cast or multicast applications. RTP data may contain information such as data that identifies the source of the video packet and type of encoding applied to the contents of video payload 45. The RTP segment also includes a timestamp that is used to determine the presentation time and jitter of the video content presented to the end user.

Header portion 44 may further comprise information about the relationship between the video packet and other video packets included in the sequence. A header portion 44 may comprise data that identifies if the video picture is an I-picture, a B-picture, or a P-picture. Due to the inter-packet relationships based on the picture types, the picture types are typically interwoven into the video packets to produce a packet sequence with a deterministic pattern. For example, after an initial I-picture, B-pictures and P-pictures may be inserted in an alternating fashion (e.g., I-picture, B-picture, P-picture, B-picture, P-picture, etc.). In a similar scenario, multiple B-pictures may be inserted between single P-pictures (e.g., I-picture, B-picture, B-picture, P-picture, B-picture, B-picture, P-picture, etc.). This later exemplary pattern may be compressed at a higher compression ratio than the former interweaving pattern. The showing of I-picture, B-picture, and P-picture is only for illustration purpose and is not limiting. Other kinds of inter-packet relationship may be defined and such information may be carried in the header portion 44.

The header portion 44 may further contain data for implementing and complying with the User Datagram Protocol (UDP) and the Internet Protocol (IP). Typically video and audio packet streaming applications, e.g., VOD, videoconferencing, voice-over-IP (VoIP), etc., implement UDP since this protocol does not retransmit erroneous or dropped packets. Under UDP, video packets are transmitted once, therefore, UDP is "connectionless" and does not execute a handshake to start a session. Other transport protocols may be used in other embodiments, UDP is only illustrated as an example.

As video packet sequence 32 transits from the source computer system 12 to the one or more destination computer systems 16, some of the packets may be lost. Packet loss may also be caused by a network device that interacts with the video packets as they transit from the source to the destination(s). For example, packet sequence 32 may experience one or more queues during transmission which may be shared by other users. If these queues have a relatively small size, one or more of the packets may be lost based on the size of the packets and the size of the queues. Consequently the video content stored in the packets is lost. Even though portions of the overall video content may be lost, the video content received at the one or more destination computer systems may still be presented to the end user(s).

Figure 3A:
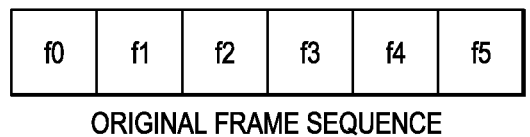
Figure 3B:
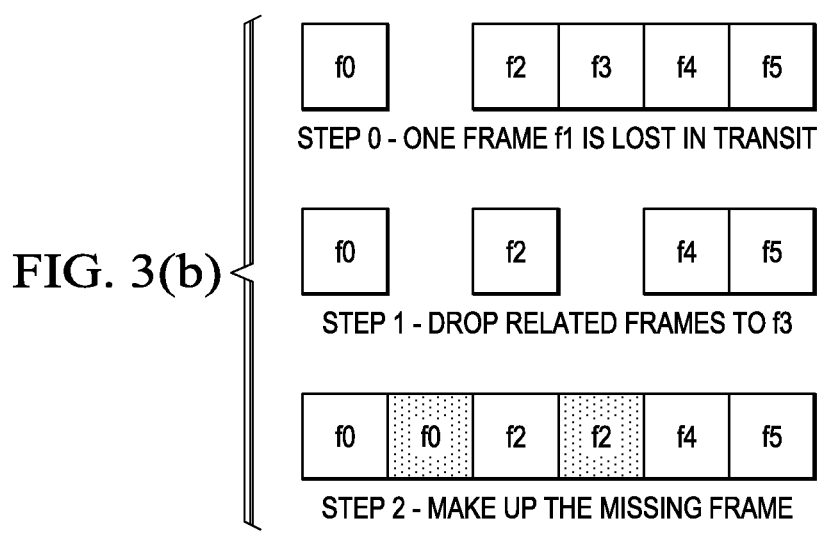

There may be many different ways to present to an end user a video packet sequence 32 transmitted over the network with some frames lost. FIGS. 3(*a*) and 3(*b*) present one illustrative embodiment showing how a video packet sequence 32 with a lost frame is reconstructed and presented to an end user. A method may be used by a destination computing device 16 to recreate a close approximation of the original video frame sequence if a frame is lost during the transmission or discard due to some reason.

The frame sequence shown in FIG. 3(*a*) is the original video frame sequence been transmitted at the source. The number of frames shown is only for illustrative purposes, and are not limiting. Suppose a frame f1 is lost during the transmission, as shown in FIG. 3(*b*) step 0. The lost frame f1 may be an I-picture, a B-picture, or a P-picture. If the frame f1 is a P-picture, there may be other subsequent frames, e.g., f3, depends on the content of frame f1 for its decoding. Therefore the loss of frame f1 will make the frame f3 impossible to decode even if frame f3 is received correctly. Accordingly, frame f3 is dropped without decoding, as shown in step 1 of FIG. 3(*b*). With two frames missing, the decoder in the receiver end may reconstruct the received sequence with the missing frames by other means. As shown in step 2 of FIG. 3(*b*), one method to make up the missing frame is to reuse the most currently received ones. For example, frame f1 is lost in transit, therefore the most recently received frame f0 is reused in place of f1; the frame f3 is dropped from decoding since it depends on the lost frame f1 and can not be decoded correctly, the most recently received frame f2 is used in place of f3. As shown in FIG. 3(*b*) step 2, applying the replacement method, the receiver decoder makes up a new sequence of frames of the same length as the original frame transmitted in FIG. 3(*a*). The receiver can then decode the new sequence of frames shown in step 2 of FIG. 3(*b*).

There may be many other replacement methods to replace the lost and dropped frames. For example, instead of using the most recent received frame to replace a missing frame, one can use an average frame of the one before and after the missing frame to replace the missing frame. There may be other ways to take into consideration of various correlations between various frames in the sequence to replace the missing frames.

As shown in FIG. 3(*b*), the frame lost is a P-picture. There may be other kind of frame lost, such as I-picture or B-picture. For a frame, all other frames that depend on the frame is called its related frames. If a frame is lost, all its related frames may not be able to decode and therefore have to be dropped, and the receiver has to replace the missed and dropped frames with other information. Different I-picture, B-picture, and P-picture have different related frames for decoding in the sense that certain packet loss may cause a larger number of related frames unusable. For example, in an IBBP pattern coded video stream, an I frame missing in transit may not cause any other frames dropped for the decoder of the receiver, while B/P frame drops will cause all frames unusable up to the next I frame.

Furthermore, the content of the video sequence may cause different levels of QoE degradation. For example, losing frames in a hi-action sequence like football matches, will cause more degradation than, say a talking head in a news anchor sequence.

To quantitatively measure the difference between a frame lost in transmission and its impact to QoE of end users, an metric to characterize the frame drop induced losses that reflect the content difference and the related frame difference is illustrated in FIG. 3(*c*). Suppose there are frames $\{f_1, \ldots, f_m\}$ in a video sequence sent by a user to another user, and one frame $f_i$ is lost, therefore the decoder has to drop $\{f_{i1}, \ldots, f_{ik}\}$, which are all the related frames to the frame fi. The dropped frames $\{f_{i1}, \ldots, f_{ik}\}$, are replaced in the decoding process by some derived frames $\{f'_{i1}, \ldots, f'_{ik}\}$ while the lost frame $f_i$ is replaced by $f'_i$. Moreover, the difference between the replacing frame $f_j$ and $f'_j$ is denoted by d $(f_j, f'_j)$. Therefore the average of the differences $$d_i = \frac{1}{m}\sum_1^m d(f_j, f'_j),$$

as shown in FIG. 3(*c*), can be used to measure the overall QoE difference to an end user caused by the frame $f_i$ loss.

The formula shown in FIG. 3(*c*) measuring the difference caused by one frame drop $f_i$ does not depend on a specific frame distortion metric $d(f_j, f'_j)$ on individual frames. This offers additional flexibility. There are a number of ways to compute the individual frame distortion rate $d(f_j, f'_j)$. The mean-squared error (MSE) has been widely used in image processing. The color histogram-based distance is also a popular choice. A frame distortion metric that is based on the weighted sum of color change and motion activity may be used as well, wherein the color change may be computed from the MPEG-7 color layout feature. To better reflects the human perception while can be computed efficiently, a metric that is based on the scale and user preference can also be used to measure individual frame distortion rate.

No matter which individual frame distortion rate formula is used, the formula shown in FIG. 3(*c*) summarizes the difference one frame drop makes overall after dropping the lost frame and its related frame, and substitute those frames by some other received frames which can be decoded, following different replacement strategies.

As illustrated so far, when a video frame is lost, all its related frames are dropped even if the related frames have been received in good order. A frame can have a different number of related frames and they create different impacts on QoE to the end users. This observation may be used to design better multimedia queue management systems to better manage multimedia traffic in transit. As illustrated in FIG. 2, when a video packet sequence 32 transits from the source computer system 12 to the one or more destination computer systems 16, some of the packets may be lost, caused by one or more queues during transmission when these queues have a relatively small size, while the packet size and the number of packets may be large.

FIG. 4(*a*) illustrates a queue manager 100 including a number of queues in communication with a scheduler 101. The queue manager 100 may reside in any of the network node 102, 104, 106, and 108 in FIG. 1, which may be an edge router, a core router, or an ATM switch. The node may be a multimedia gateway in a wireless network, or any other kind of access network. The node on which the queue manager 100 resides may perform other functions such as converting digital media streams between disparate telecommunications networks such as PSTN, SS7, Next Generation Networks (2G, 2.5G and 3G radio access networks) or PBX over multiple transport protocols such as Asynchronous Transfer Mode (ATM) and Internet Protocol (IP), besides the queue scheduling.

In simpler terms, the queue manager 100 comprises a memory that is organized into a number of queues and a processor adapted to act as a scheduler. The queues include a first input queue 105A, a second input queue 105B, up to an Nth input queue 105N (referred to hereinafter collectively or individually as 105). The queues 105 may be from different users or from the same user transmitting different traffic. The queues are assumed to have multimedia traffic. The input queues 105 may encompass the possibility that something other than a queue, for example, another scheduler, may take the place of one or more of the input queues 105. Associated with the scheduler 101 is an output queue 109 that accepts the scheduled packets from the plurality of input queues 105.

Each input queue 105 stores incoming packets of data. The term "packet" is selected to represent a protocol data unit, which, for example, may be an Internet Protocol (IP) packet, a cell in an Asynchronous Transfer Mode (ATM) communication system or a frame of data in another communication system. Each input queue 105 stores incoming packets in fixed-size units of storage, which may be called cell buffers. Notably, the size of the cell buffers in the input queues 105 may be smaller than the maximum size of packet that the queue manager 100 is expected to handle. As such, a large packet may occupy more than one cell buffer. An cell buffer 112 is indicated in FIG. 4(a).

The scheduler 101 schedules service amongst competing input queues 105. That is, the scheduler 101 determines when a cell buffer-worth of data will be transferred from a given input queue 105 to the output queue 109. Each of the competing input queues 106 has associated parameters including a weight, such as Wa, Wb, . . . , and Wn shown in FIG. 4(a). The number Wa, Wb, . . . , and Wn may all be equal to 1, in which case all the queues are of equal weight. If a queue has a weight Wa which is bigger than the weight for another queue Wb, then the weight Wa queue has higher priority in scheduling than the weight Wb queue. The weights may be assigned by network operators, or by the users.

Each of the functions of the scheduler 101 can be implemented in application-specific hardware, which typically is the preferred implementation when high speed is a requirement. However, in an alternative implementation, the scheduler 101 may be loaded with queue management software for executing embodiment methods from a software medium 126, which could be a disk, a tape, a chip or a random access memory containing a file downloaded from a remote source.

Figure 4A:
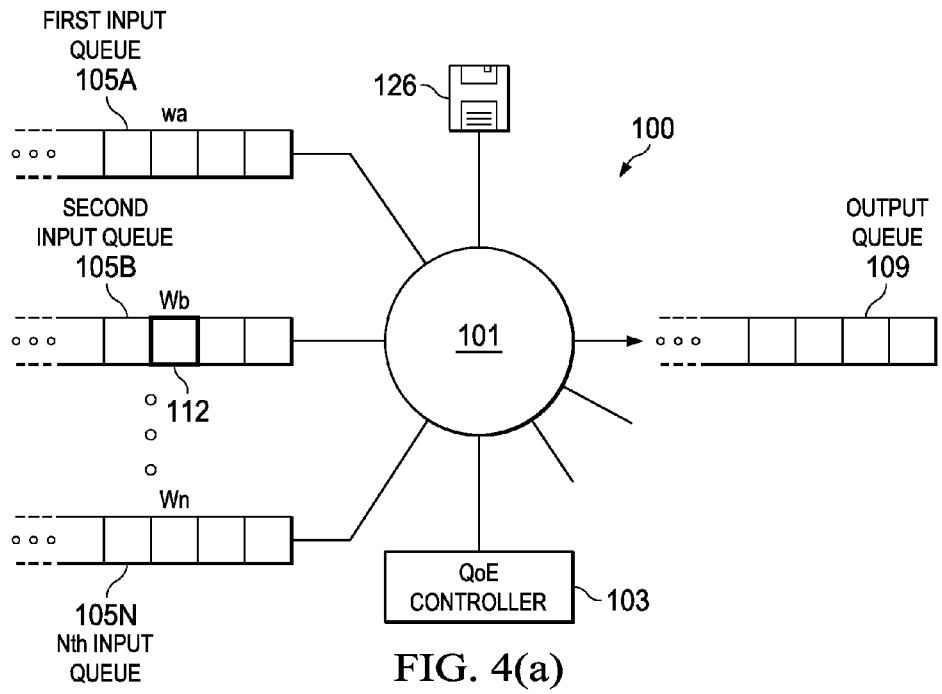
FIGS. 4(a)-4(b) illustrate methods and systems for managing multimedia queues that adapt the traffic to throughput variations, while preserving QoE based on the multimedia content and user priorities.

The queue manager 100 illustrated in FIG. 4(a) further comprises a QoE controller 103, which monitors the performance of the queues, prevents packet loss to the extent possible, and controls the impact of the packet loss to QoE to a plurality of end users. The queues 105 may start with an acceptable QoS and change status to have queue overflow due to the user traffic bit rate fluctuations, communication condition change, network configuration changes and so on, which affects the size of the queues. The QoE controller 103 may monitor the queue status of each individual queue, and start performing QoE control operations when queue status changes such as the increase of queue sizes, or the number of users increases. The QoE controller may be informed by a user ahead of a transmission that the queue status may be changed because the user is going to send a large amount of video data. The QoE controller may further be triggered by an end user informing the QoE controller that the QoE at the receiving end is not acceptable. The QoE may further randomly start testing the queue conditions, or start operation in a periodical manner.

Once the network traffic or condition has changed and the total network throughput, bit rate, or some other network performance rate needs to be reduced by R=x %, the QoE controller 103 may schedule certain packets from certain queues to be dropped instead of randomly dropping the packets. In this way, the QoE controller 103 can control the degradation on the QoE to the end users caused by the QoS change at the network. FIG. 3(c) illustrates a formula summarizing the difference one frame drop makes after dropping the lost frame and its related frame, and substituting those frames by some other received frames which can be decoded, following certain replacement strategies. The queue manager may utilize this formula to selectively drop a frame and all of its related frames at the same time, since even if the related frames are transmitted and received in good order, they will have to be dropped by the receiver and replaced by some other frames because they can not be decoded by the receiver. In this way, dropping one frame may cause a plurality of related frames being dropped. Furthermore, the number of related frames may be different for a different class of frames, and therefore introduce different rate reduction and performance improvement.

The QoE controller may use a combinatorial optimization technique with exponential complexity to select packets to be dropped. For an m-frame sequence, if the QoE controller wants to drop k frames, there are total $$\binom{m}{k}$$

possibilities. The computation for such a scheme may be expensive, giving the currently available best solutions which may involve a computationally expensive Viterbi-like dynamic programming.

Figure 4B:
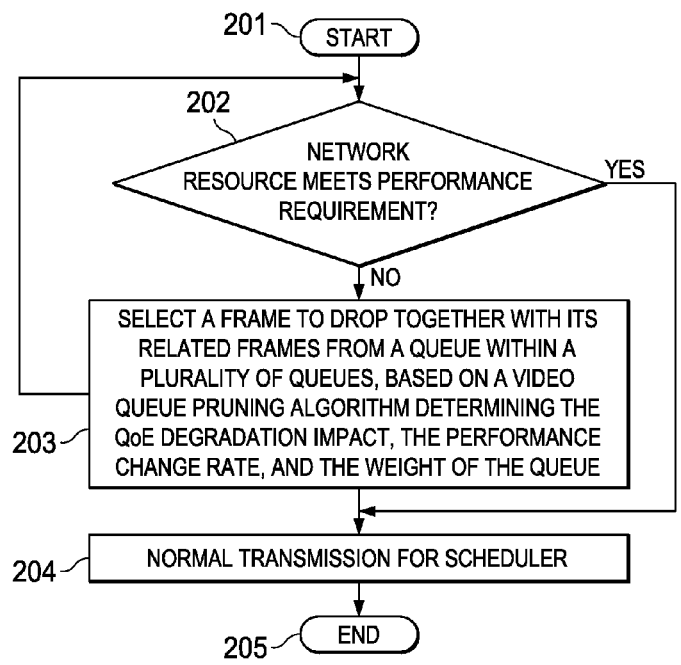

The QoE controller may use an illustrative near optimal heuristic solution as shown in FIG. 4(b) to selectively drop one frame and its related frames, until the required performance is met. When QoE controller starts operation at step 201, the network resources and performance are tested on data received to determine whether the network resource meets the performance requirement in step 202. If the answer is Yes, the QoE controller performs no operation and the scheduler 101 performs normal transmission. If the result is No in step 202, which means the network resources such as queue lengths do not meet the performance requirement, the QoE controller 103 starts to select a frame to drop together with its related frames from a traffic queue within a plurality of queues using a Video Queue Pruning Algorithm. After the QoE controller 103 drops a frame, which is called the dropping frame, together with its related frames from the selected traffic queue, the QoE controller tests whether the network resources meet the performance requirement. If not, the process continues, and the QoE controller 103 selects a next dropping frame together with its related frames to drop from a traffic queue within a plurality of queues using a Video Queue Pruning Algorithm.

Suppose there are N queues as shown in FIG. 4(a), Suppose frames $\{f_1, \ldots, f_m\}$ in a video sequence sent by a user to another user are stored in a queue 105A, and one frame $f_i$ is scheduled to be dropped, therefore the QoE controller drops without transmit those related frames $\{f_{i1}, \ldots, f_{ik}\}$, which are all the related frames to the frame $f_i$. The number of frames m is used to represent the number of frames in one queue. Different queues may have different number of frames even if the same notation m is used to represent the number of frames in different queues. At the destination computer, the dropped frames $\{f_{i1}, \ldots, f_{ik}\}$, are replaced in the decoding process by some derived frames $\{f'_{i1}, \ldots, f'_{ik}\}$ while the dropped frame $f_i$ is replaced by $f'_i$. Moreover, the difference between the replacing frame $f_j$ and $f'_j$ is denoted by d ($f_j$, $f'_j$). Therefore the average of the differences $$d_i = \frac{1}{m}\sum_1^m d(f_j, f'_j),$$

as shown in FIG. 3(c), measures the overall QoE difference to an end user caused by the frame $f_i$ drop.

On the other hand, the drop of frames $f_i$ together with its related frames $\{f_{i1}, \ldots, f_{ik}\}$ will increase the capacity of the queue 105A, and increase the rate of transmission or other network performance rate changed by $r_i$. Generally, if a frame $f_i$ has more related frames $\{f_{i1}, \ldots, f_{ik}\}$, dropping the frame $f_i$ will cause all the related frames being dropped as well, therefore it will have more performance improvement by dropping the frame $f_i$, while it may have more degradation to QoE to the end users.

The gradient $$g_i = \frac{d_i}{r_i}$$

of the frame $f_i$ of a queue may be calculated as the result of $$d_i = \frac{1}{m}\sum_1^m d(f_j, f'_j),$$

divided by the rate change $r_i$. The smaller the $g_i$, the smaller distortion rate caused to the video sequence by the drop of the frame $f_i$ and its related frames, and the bigger the network performance rate change the dropping of the frame $f_i$ and its related frames may cause. Therefore the QoE Controller 103 may select a frame with the smallest $$g_i = \frac{d_i}{r_i}$$

to drop for any queue if a frame needs to be dropped from the queue. For each queue, the frame with the smallest gradient $$g_i = \frac{d_i}{r_i}$$

is called a candidate frame for the queue. A queue may have multiple candidate frames, and they are treated the same for the QoE controller. For each of the N queue, the Video Queue Pruning algorithm finds a candidate frame, where all the candidate frames form a set of candidate frames, one for each queue. The method then selects a dropping frame among all the candidate frames, taking into consideration of the queue weights and frame gradients. This process continues until the performance meets the resource constraints.

The Video Queue Pruning Algorithm may be summarized in the following:

Video Queue Pruning Algorithm
FOR k=1: N queue
For frame i=1 to m in queue k,
compute or receive the gradient of frame i, $g_i = d_i/r_i$, defined by the QoE distortion rate over the network performance rate change, by considering dropping frame i and all its related frames.
Select a candidate frame of queue k which has the minimal gradient among all the frames in queue k, $$g_k = \min_{j \in [1 \ldots m]} \frac{d_j}{r_j}$$

Select a first dropping frame which is a candidate frame of a first queue among N queues, taking into consideration of the weight $w_k$ of the queue k for all k.

$$k^* = \arg\min_k\{w_k w g_k\}.$$

Drop the first dropping frame of the first queue k* and all its related frames from queue k*.

By taking into the impact of QoE to the end user, the Video Queue Pruning Algorithm can drop a frame and its related frames which have the least QoE degradation to the user. Therefore a user with an "easy" video sequence can help those users with "busy" sequence when network resources become limited. By taking into consideration of the priority weight $w_k$, the algorithm can reduce the impact to more important users when network resources become limited. When the weight is 1 for all users, then all users and queues will be treated equally.

In some embodiments, the communication and computation overhead can be very small, as the computation can be done by the user and stored in the queue for each frame with the meta data {frame number, distortion rate, network performance rate change} information tuples, which is determined by the frame and its related frames in the video sequence in a queue. Given this tuple for each frame, the QoE controller can easily compute the gradient for each frame. In some embodiments, the gradient for each frame may be computed by the frame sender and stored as a meta data for each frame in the queue.

In some embodiment, the first step of the Video Queue Pruning Algorithm can be computed for the I-picture, B-picture, and P-picture. The algorithm is demonstrated in the following:

Algorithm 1—Gradient Computing
1. Compute all B-frame drop induced network performance rate changes and the distortion rates, if dropped together with its related frames.

$$\min_{j \in B \text{ frame}} \frac{d_j}{r_j}$$

2. Compute all P-frame drop induced network performance rate changes and the distortion rates, if dropped together with its related frames.

3. Compute all I-frame (except the first frame, not allowed) drop induced network performance rate changes and the distortion rates, if dropped together with its related frames.

$$\sum_{j \in P \ frame} \frac{d_j}{r_j}$$

$$\sum_{j \in I \ frame} \frac{d_j}{r_j}$$

Although the present embodiments and their advantages have been described in detail, it should be understood that various changes, substitutions and alterations can be made herein without departing from the spirit and scope of the embodiments as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for managing a first number of queues each having a queue priority weight, the method comprising:
    selecting a set of candidate frames comprising a candidate frame for each queue among the first number of queues, wherein each queue among the first number of queues has a different and independent media stream, wherein each frame in each queue among the first number of queues has a frame gradient in accordance with a gradient function indicating a network performance rate change and a distortion rate caused by the each frame and the each frame's related frames in the each queue among the first number of queues, and wherein each candidate frame for the each queue among the first number of queues has a minimal candidate frame gradient for the each queue among the first number of queues;
    selecting a first dropping frame from the set of candidate frames in accordance with the candidate frame gradients and the queue priority weights, wherein the first dropping frame has a minimal product of associated candidate frame gradient and associated queue priority weight; and
    dropping the first dropping frame and the first dropping frame's related frames.

2. The method of claim 1, further comprising:
    selecting a second dropping frame from the set of candidate frames, in accordance with the candidate frame gradients and the first dropping frame's related frames not meeting a predetermined performance metric; and
    dropping the second dropping frame and the second dropping frame's related frames.

3. The method of claim 1, wherein the frame gradient of the frame in the queue is the distortion rate caused by the frame and the frame's related frames in the queue divided by the network performance rate change caused by the frame and the frame's related frames in the queue.

4. The method of claim 3, wherein the distortion rate of the frame in the queue is in accordance with a sum of each individual frame distortion rate of the frame and the frame's related frames in the queue when the frame and the frame's related frames are replaced by some other frames derived from remaining frames in the queue in accordance with a first replacement method.

5. The method of claim 4, wherein an individual frame distortion rate of the frame is an individual distortion rate between the frame and the frame's replacement frame in accordance with a Mean-squared error (MSE) method, a color histogram-based distance method, or a weighted sum of color change method.

6. The method of claim 4, wherein the distortion rate of the frame in the queue is an average of each individual frame distortion rate of the frame and the frame's related frames in the queue when the frame and the frame's related frames are replaced by some other frames derived from remaining frames in the queue in accordance with the first replacement method.

7. The method of claim 4, wherein the first replacement method replaces the frame by the frame's immediate precedent frame in the queue that is not to be replaced.

8. The method of claim 1, wherein the frame of the queue is a portion of an associated multimedia file of the queue.

9. The method of claim 1, wherein the frame of the queue comprises a plurality of packets of a network.

10. The method of claim 1, wherein the frame of the queue is an Intra coded picture, a Bidirectional picture, or a Predicted picture of an associated video file of the queue.

11. The method of claim 1, wherein the related frames of the frame cannot be decoded by an end user without the frame.

12. The method of claim 1, wherein the frame gradient of the frame is computed by a sender of the frame, or by a controller within a network.

13. The method of claim 1, wherein the network performance rate change is in accordance with a throughput of a network, a peak rate of the network, or a length of the queue.

14. The method of claim 1, wherein the method is implemented by application specific hardware.

15. An apparatus for managing a first number of queues each having a queue priority weight, the apparatus comprising:
    a processor for selecting a set of candidate frames comprising a candidate frame for each queue among the first number of queues, wherein each queue among the first number of queues has a different and independent media stream, wherein each frame in each queue among the first number of queues has a frame gradient in accordance with a gradient function indicating a network performance rate change and a distortion rate caused by the each frame and the each frame's related frames in the each queue among the first number of queues, and wherein each candidate frame for the each queue among the first number of queues has a minimal candidate frame gradient for the each queue among the first number of queues, for selecting a first dropping frame from the set of candidate frames in accordance with the candidate frame gradients and the queue priority weights, wherein the first dropping frame has a minimal product of associated candidate frame gradient and associated queue priority weight, and for dropping the first dropping frame and the dropping frame's related frames; and a non-transitory memory for storing the queues, wherein the memory is operatively coupled to the processor.

16. The apparatus of claim 15, further comprising:

the processor for selecting a second dropping frame from the set of candidate frames, in accordance with the candidate frame gradients and the queue priority weights, when a network performance rate change caused by the first dropping frame and the first dropping frame's related frames not meeting a predetermined performance metric, and for dropping the second dropping frame and the second dropping frame's related frames.

17. The apparatus of claim 15, wherein the frame gradient of the frame in the queue is the distortion rate caused by the frame and the frame's related frames in the queue divided by the network performance rate change caused by the frame and the frame's related frames in the queue.

18. The apparatus of claim 17, wherein the distortion rate of the frame in the queue is in accordance with a sum of each individual frame distortion rate of the frame and the frame's related frames in the queue when the frame and the frame's related frames are replaced by some other frames derived from remaining frames in the queue in accordance with a first replacement method.

19. The apparatus of claim 18, wherein an individual frame distortion rate of the frame is an individual distortion rate between the frame and the frame's replacement frame in accordance with a Mean-squared error (MSE) method, a color histogram-based distance method, or a weighted sum of color change method.

20. The apparatus of claim 18, wherein the distortion rate of the frame in the queue is an average of each individual frame distortion rate of the frame and the frame's related frames in the queue when the frame and the frame's related frames are replaced by some other frames derived from remaining frames in the queue in accordance with the first replacement method.

* * * * *